(12) United States Patent
Rajab et al.

(10) Patent No.: US 11,356,892 B2
(45) Date of Patent: Jun. 7, 2022

(54) CHANNEL CONGESTION CONTROL IN V2X COMMUNICATION

(71) Applicant: Honda Motor Co., Ltd., Tokyo (JP)

(72) Inventors: Samer Rajab, Novi, MI (US); Ehsan Moradi Pari, Dublin, OH (US); Xue Bai, Novi, MI (US); Abolfazl Hajisami, San Diego, CA (US)

(73) Assignee: Honda Motor Co., Ltd., Tokyo (JP)

( * ) Notice: Subject to any disclaimer, the term of this patent is extended or adjusted under 35 U.S.C. 154(b) by 50 days.

(21) Appl. No.: 16/895,733

(22) Filed: Jun. 8, 2020

(65) Prior Publication Data

US 2021/0385684 A1 Dec. 9, 2021

(51) Int. Cl.
*H04W 28/02* (2009.01)
*H04L 1/00* (2006.01)
*H04W 4/44* (2018.01)
*H04W 4/46* (2018.01)

(52) U.S. Cl.
CPC ....... *H04W 28/0289* (2013.01); *H04L 1/0003* (2013.01); *H04W 4/44* (2018.02); *H04W 4/46* (2018.02)

(58) Field of Classification Search
None
See application file for complete search history.

(56) References Cited

U.S. PATENT DOCUMENTS

| | | | |
|---|---|---|---|
| 10,135,562 B2 | 11/2018 | Zhang et al. | |
| 10,356,652 B2 | 7/2019 | Ma et al. | |
| 10,383,147 B2 | 8/2019 | Rajagopal et al. | |
| 10,448,281 B2 | 10/2019 | Sundman et al. | |
| 2013/0176864 A1 | 7/2013 | Quan et al. | |
| 2018/0323900 A1 | 11/2018 | Gulati et al. | |
| 2019/0104525 A1* | 4/2019 | Santhanam | H04W 72/02 |
| 2019/0115999 A1 | 4/2019 | Sundman et al. | |
| 2019/0260497 A1 | 8/2019 | Wang et al. | |
| 2019/0313279 A1 | 10/2019 | Li et al. | |
| 2020/0015111 A1 | 1/2020 | Martinez et al. | |
| 2020/0029245 A1* | 1/2020 | Khoryaev | H04W 4/46 |
| 2021/0219268 A1* | 7/2021 | Li | H04L 1/08 |

FOREIGN PATENT DOCUMENTS

WO 2018204161 A2 11/2018

* cited by examiner

*Primary Examiner* — Adnan Baig
(74) *Attorney, Agent, or Firm* — Clifford B Vaterlaus; American Honda Motor Co., Inc.

(57) ABSTRACT

An electronic apparatus and method for channel congestion control in V2X communication is provided. The electronic apparatus determines an initial MCS level associated the V2X communication channel of the vehicle and estimates a first level of channel congestion in the V2X communication channel at the initial MCS level. Thereafter, the electronic apparatus selects, from a plurality of MCS levels for V2X communication, a first MCS level associated with a first threshold level of a plurality of threshold levels of the channel congestion. The selection of the first MCS level is based on a determination that the first level of the channel congestion is greater than or equal to the first threshold level. The selected first MCS level is greater than the initial MCS level. The electronic apparatus transmits, at the selected first MCS level, message information over the V2X communication channel to a group of electronic devices.

20 Claims, 7 Drawing Sheets

CHANNEL CONGESTION CONTROL IN V2X COMMUNICATION

BACKGROUND

Vehicle-to-Everything (V2X) communication is an ad hoc wireless communications technology. In V2V communication, a large number of vehicles may typically transmit their information at the same time within a close spatial proximity. When a large enough number of vehicles transmit data, the medium (frequency channel) of a receiving vehicle becomes congested.

Limitations and disadvantages of conventional and traditional approaches will become apparent to one of skill in the art, through comparison of described systems with some aspects of the present disclosure, as set forth in the remainder of the present disclosure and with reference to the drawings.

SUMMARY

An exemplary aspect of the disclosure provides an electronic apparatus for channel congestion control in Vehicle-to-Everything (V2X) communication. The electronic apparatus may include circuitry that may be configured to determine an initial Modulation and Coding Scheme (MCS) level associated V2X communication channel of the vehicle. The circuitry may further be configured to estimate, at the determined initial MCS level, a first level of channel congestion in the V2X communication channel and select, from a plurality of MCS levels for V2X communication, a first MCS level associated with a first threshold level of a plurality of threshold levels of the channel congestion. The selection of the first MCS level may be based on determination that the estimated first level of the channel congestion is greater or equal to the first threshold level and the selected first MCS level is greater than the initial MCS level. The circuitry may further be configured to transmit, at the selected first MCS level, message information over the V2X communication channel to a group of electronic devices.

Another exemplary aspect of the disclosure provides a vehicle for channel congestion control in the V2X communication. The vehicle may include circuitry that may be configured to determine an initial Modulation and Coding Scheme (MCS) level associated V2X communication channel of the vehicle. The circuitry may further be configured to estimate, at the determined initial MCS level, a first level of channel congestion in the V2X communication channel and select, from a plurality of MCS levels for V2X communication, a first MCS level associated with a first threshold level of a plurality of threshold levels of the channel congestion. The selection of the first MCS level may be based on determination that the estimated first level of the channel congestion is greater or equal to the first threshold level and the selected first MCS level is greater than the initial MCS level. The circuitry may be further configured to transmit, at the selected first MCS level, message information over the V2X communication channel to a group of electronic devices.

Another exemplary aspect of the disclosure provides a method for channel congestion control in the V2X communication. The method may include determining an initial Modulation and Coding Scheme (MCS) level associated with the V2X communication channel of a vehicle and estimating, at the determined initial MCS level, a first level of channel congestion in the V2X communication channel. The method may further include selecting, from a plurality of MCS levels for V2X communication, a first MCS level associated with a first threshold level of a plurality of threshold levels of the channel congestion. The selection of the first MCS level may be based on determination that the estimated first level of the channel congestion is greater or equal to the first threshold level, and the selected first MCS level is greater than the initial MCS level. The method may further include transmitting, at the selected first MCS level, message information over the V2X communication channel to a group of electronic devices.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in a disclosed electronic apparatus for controlling congestion level in V2X communication through Modulation and Coding Scheme (MCS) adjustment. In wireless communications, multiple levels of MCS are defined. Such levels of the MCS may be required to adjust a level of modulation and a coding rate of a transmitted signal. A lower MCS may result in more robust transmission and less attenuation impact, covering a larger distance. However, the lower MCS may be less efficient as it modulates low number of bits in each symbol. In noisy/fast fading environments with high Bit Error Rate (BER), a lower MCS may be used. When the BER is low, a high MCS may be desired to increase a throughput and a medium usage efficiency.

The disclosed electronic apparatus relates to congestion control in a V2X communication channel, through which message information may be transmitted to a group of electronic devices. The group of electronic devices may include, for example, communication units of vehicles or other electronic devices, such as roadside units (RSU), mobile phones, cloud servers, traffic systems, telecom facility, or edge networking devices.

In one implementation, the electronic apparatus (i.e. a transmitting device) may measure a channel busy ratio to estimate a level of channel congestion in its V2X communication channel. Different threshold levels of the channel congestion may be defined and paired with different MCS levels. If the electronic apparatus detects a higher congestion level (i.e. above a defined threshold), then the electronic apparatus may update an initial MCS level associated with the V2X communication channel to a higher MCS level (higher than the initial MCS level). Such an update may result in alleviating the medium congestion by reducing duration of data packets which may be transmitted over the V2X communication channel.

In an alternate implementation, the electronic apparatus may use two different MCS levels to transmit messages if a higher congestion level is detected. The messages may be broadcasted at a higher MCS level with a higher transmit rate, and at a lower MCS level with a lower transmit rate. This implementation may enable vehicles that are closer to the electronic apparatus to track the messages with a higher accuracy. Other vehicles that may be further away from the electronic apparatus may track the messages at a lower frequency. Nevertheless, the overall medium congestion may be reduced as a higher transmit rate may use a more efficient MCS level.

Reference will now be made in detail to specific aspects or features, examples of which are illustrated in the accompanying drawings. Wherever possible, corresponding or similar reference numbers will be used throughout the drawings to refer to the same or corresponding parts.

Figure 1:
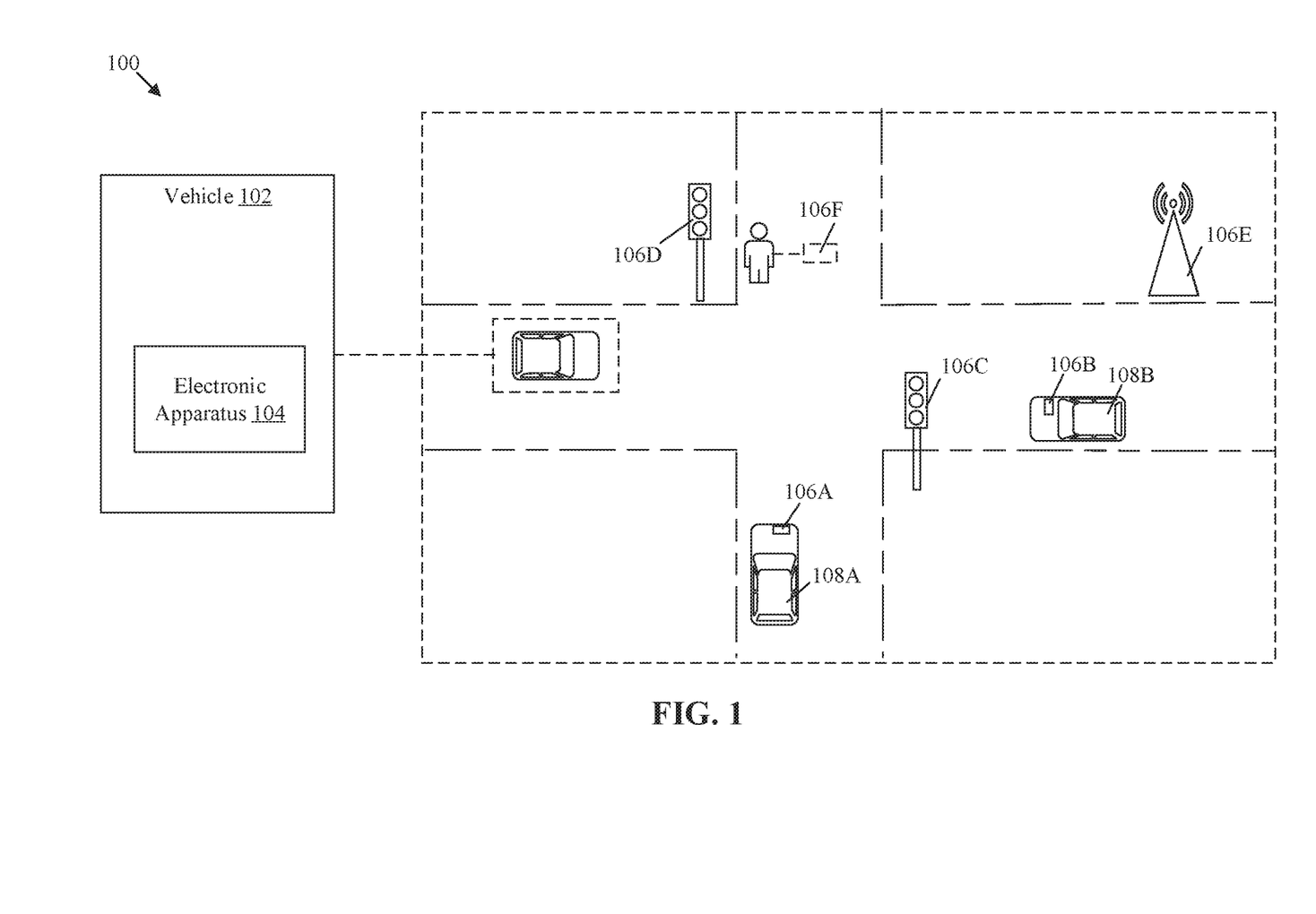
FIG. 1 is a diagram that illustrates an exemplary environment for control of congestion in a V2X communication channel, in accordance with an embodiment of the disclosure.

FIG. 1 is a diagram that illustrates an exemplary environment for control of congestion in a V2X communication channel, in accordance with an embodiment of the disclosure. With reference to FIG. 1, there is shown a diagram of an exemplary environment 100. The exemplary environment 100 may include a vehicle 102, an electronic apparatus 104, and a group of electronic devices 106A . . . 106F which may be configured to communicate with the vehicle 102 over a Vehicle-to-Everything (V2X) communication channel of the vehicle 102. The electronic apparatus 104 may be included in the vehicle 102 and may be responsible for handling V2X communication of the vehicle 102 over the V2X communication channel.

The vehicle 102 may be one of a semi-autonomous vehicle, a fully autonomous vehicle, or a non-autonomous vehicle, in accordance with a particular level of automation, for example, as one of the different levels (e.g., 0, 1, 2, 3, 4, and 5) of automation defined by National Highway Traffic Safety Administration (NHTSA). Examples of the vehicle 102 may include, but are not limited to, a two-wheeler vehicle, a three-wheeler vehicle, a four-wheeler vehicle, a hybrid vehicle, or any vehicle that uses one or more distinct renewable or non-renewable power sources.

The electronic apparatus 104 may include suitable logic, circuitry, and interfaces that may be configured to monitor a level of channel congestion associated with the V2X communication channel of the vehicle 102. The level of the channel congestion may be monitored to decide whether a control over the channel congestion is required. If required, the electronic apparatus 104 may decongest the V2X communication channel by adaptively switching to a suitable modulation and coding scheme (MCS) level for data transmission over the V2X communication channel.

In an embodiment, the electronic apparatus 104 may be implemented as a communication unit of the vehicle 102. In addition to V2X communication with the group of electronic devices 106A . . . 106F, the TCU may handle emergency calling services of the vehicle 102, vehicle health reporting service, installation of software updates/patches, and/or access to phone/internet network. In another embodiment, the electronic apparatus 104 may be implemented as a V2X communication module alongside the TCU for handling the V2X communication with the group of electronic devices 106A . . . 106F. In another embodiment, the entire functionality of the TCU module may be incorporated at least partially or in its entirety in the electronic apparatus 104, without a deviation from the scope of the present disclosure.

The group of electronic devices 106A . . . 106F may be configured to communicate with the electronic apparatus 104 of the vehicle 102 over the V2X communication channel. V2X communication between the vehicle 102 and each of the group of electronic devices 106A . . . 106F may be via one or more communication protocols, such as a Cellular-V2X communication protocol or a Dedicated Short Range Communication (DSRC) protocol (in accordance with Institute of Electrical and Electronics Engineers (IEEE) 802.11p standard). The C-V2X protocol may be based on a 4th generation Long Term Evolution (4G LTE) standard or 5th generation (5G) mm-wave standard, for example. Example implementations of each electronic device of the group of electronic devices 106A . . . 106F may include, but are not limited to, automotive communication or telematics unit of vehicles, traffic light systems, roadside units (for example, DSRC roadside units), electronic devices (for example, smartphones) associated with a pedestrian, cloud servers, edge devices, or a telecom facility.

For example, the group of electronic devices 106A . . . 106F are shown to include a first electronic device 106A, a second electronic device 106B, a third electronic device 106C, a fourth electronic device 106D, a fifth electronic device 106E, and a sixth electronic device 106F. Each of the first electronic device 106A and the second electronic device 106B is shown as a communication unit of a first vehicle 108A and a second vehicle 108B, respectively. Each of such communication units may be configured to handle V2X communication of the respective vehicle. Each of the third electronic device 106C and the fourth electronic device 106D is shown as a traffic light system. The fifth electronic device 106E is shown as a user device, such as a mobile phone associated with a pedestrian and the sixth electronic device 106F is shown to be RSU for a short-range Vehicle-to-Infrastructure (V2I) communication.

The V2X communication between the vehicle 102 and the group of electronic devices 106A . . . 106F may correspond to one or more of vehicle-to-infrastructure (V2I) communication, vehicle-to-network (V2N) communication, vehicle-to-vehicle (V2V) communication, vehicle-to-pedestrian (V2P) communication, vehicle-to-device (V2D) communication, or vehicle-to-grid (V2G) communication.

In operation, the electronic apparatus 104 associated with the vehicle 102 may determine an initial MCS level associated with the V2X communication channel of the vehicle 102. The initial MCS level may correspond to one of a plurality of MCS levels for V2X communication. In accordance with an embodiment, the plurality of MCS levels may be associated with one of the C-V2X communication protocol or the DSRC protocol.

The plurality of MCS levels may define various modulation modes and data transmit rates for a data signal (which carries message information over the V2X communication channel). The modulation modes defined for the plurality of MCS levels may include, for example, binary phase shift keying (BPSK) modulation, quadrature phase shift keying (QPSK) modulation, 16 quadrature amplitude modulation (16-QAM) and 64-QAM. For a communication protocol such as Long-Term Evolution (LTE)-V2X, the plurality of MCS levels may include, for example, 21 MCS levels with modulation schemes/modes ranging from QPSK (MCS level 0) to 16-QAM (MCS level 20). For a specific channel bandwidth and Time Division Duplex (TDD) frame structure, each of such modulation modes may support transmission of the message information at a particular data rate which may be fixed for the respective modulation mode. The data rate may be higher for a higher MCS level (e.g., MCS level 12) as compared to a lower MCS level (e.g., MCS level 2). Additionally, a higher MCS level (e.g. MCS level 15) may typically carry more data as compared to a lower MCS level (e.g., MCS level 2), but may require additional link budget or a stronger radio signal. In other words, a data signal transmitted at a higher MCS level may have a shorter range (in meters) as compared to another data signal which may be transmitted at a lower MCS level.

The electronic apparatus 104 may estimate, at the determined initial MCS level, a first level of channel congestion in the V2X communication channel. The first level of the channel congestion in the V2X communication channel may be estimated in terms of a percentage (or a ratio) of time the V2X communication channel is free from congestion. The first level of the channel congestion may range from 0% to 100%, with 0% indicating that the V2X communication channel is free from congestion all the time and 100% indicating that the V2X communication channel is busy all the time. For example, the initial MCS level may be "4" and the estimated first level of channel congestion at the MCS level "4" may be 67%.

After the first level of the channel congestion is estimated, a check may be performed to determine if the V2X communication channel needs to be decongested. Before the check is performed, a plurality of threshold levels of the channel congestion may be defined in terms of percentage values and stored as a congestion control setting on the electronic apparatus 104. Each threshold level of the plurality of threshold levels of the channel congestion may be paired with a corresponding MCS level of the plurality of MCS levels. Thereafter, the electronic apparatus 104 may determine whether the estimated first level of the channel congestion is greater than or equal to a first threshold level of the plurality of threshold levels. For example, if the first threshold level is 60% channel congestion, then the first level of 67% channel congestion may be greater than the first threshold level.

Based on the determination that the estimated first level of the channel congestion is greater than or equal to the first threshold level, the electronic apparatus 104 may select a first MCS level from the plurality of MCS levels for the V2X communication. The selection of the first MCS level may be based on association (or pairing) of the first MCS level with the first threshold level of the channel congestion.

In order to decongest the V2X communication channel, the electronic apparatus 104 may update the initial MCS level to the selected first MCS level. The first MCS level may be selected to be higher than the initial MCS level. For example, if the estimated first level of channel congestion at the initial MCS level "4" is 67% and the first threshold level is 60%, then the electronic apparatus 104 may select the first MCS level as MCS level "5".

As the initial MCS level is updated to a higher MCS level (i.e. the first MCS level), the duration of data packets over the V2X communication channel may decrease causing the level of the channel congestion to decrease. The decrease in the duration of data packets may be due to a higher transmit rate supported by the selected first MCS level as compared to a lower transmit rate supported by the initial MCS level. Based on the update, the electronic apparatus 104 may transmit the message information at the selected first MCS level over the V2X communication channel to the group of electronic devices 106A . . . 106F.

Figure 2:
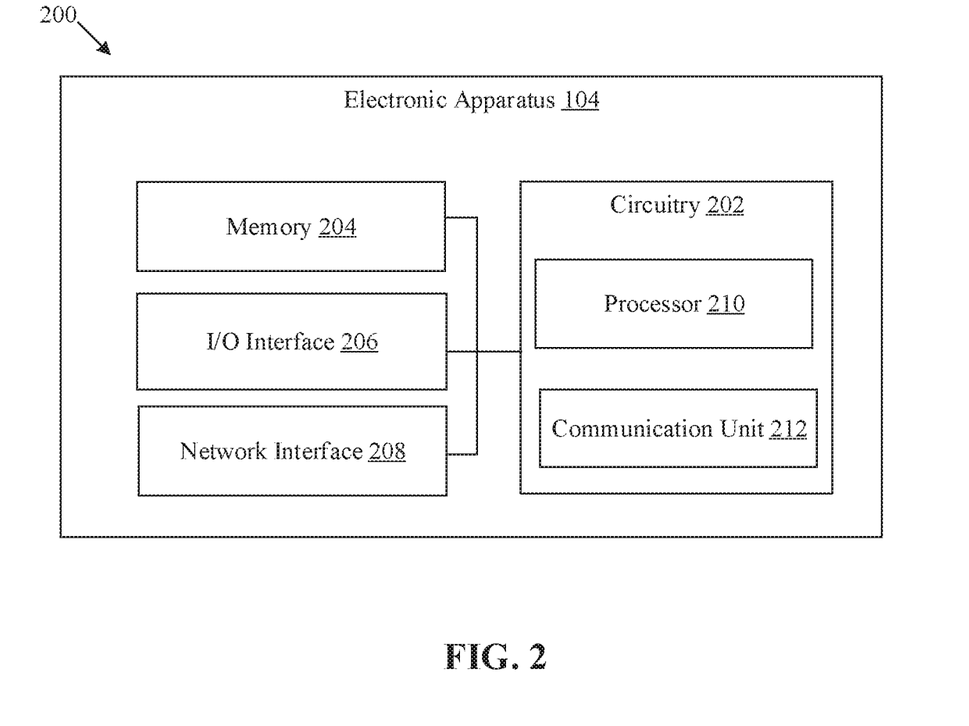
FIG. 2 is a block diagram of an exemplary electronic apparatus for control of congestion in a V2X communication channel, in accordance with an embodiment of the disclosure.

FIG. 2 is a block diagram of an exemplary electronic apparatus for control of congestion in a V2X communication channel, in accordance with an embodiment of the disclosure. FIG. 2 is explained in conjunction with elements from FIG. 1. With reference to FIG. 2, there is shown a block diagram 200 of the electronic apparatus 104. The electronic apparatus 104 may include circuitry 202, a memory 204, and an input/output (I/O) interface 206, and a network interface 208. The circuitry 202 may further include a processor 210 and a communication unit 212.

The circuitry 202 may include suitable logic, circuitry, and/or interfaces that may be configured to execute program instructions associated with different operations to be executed by the electronic apparatus 104. The circuitry 202 may include any suitable computer, computing entity, or processing device including various computer hardware or software modules and may be configured to execute instructions stored on any applicable computer-readable storage media. For example, the circuitry 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single circuitry in FIG. 2, the circuitry 202 may include any number of processors configured to, individually or collectively, perform or direct performance of any number of operations of the electronic apparatus 104, as described in the present disclosure. Additionally, one or more of the processors may be present on one or more different electronic devices, such as different servers. In some embodiments, the circuitry 202 may be configured to interpret and/or execute program instructions and/or process data stored in the memory 204 and/or a persistent data storage. In some embodiments, the circuitry 202 may fetch program instructions from a persistent data storage and load the program instructions in the memory 204. After the program instructions are loaded into the memory 204, the circuitry 202 may execute the program instructions. Some of the examples of the circuitry 202 may be a Graphical Processing Unit (GPU), a Central Processing Unit (CPU), a Reduced Instruction Set Computer (RISC) processor, an Application-Specific Integrated Circuit (ASIC) processor, a Complex Instruction Set Computer (CISC) processor, a co-processor, and/or a combination thereof.

The memory 204 may include suitable logic, circuitry, interfaces, and/or code that may be configured to store the program instructions executable by the circuitry 202. The memory 204 may be configured to store information, such as MCS table and threshold levels of the channel congestion for the V2X communication. In certain embodiments, the memory 204 may be configured to store operating systems and associated application-specific information. The memory 204 may include computer-readable storage media for carrying or having computer-executable instructions or data structures stored thereon. Such computer-readable storage media may include any available media that may be accessed by a general-purpose or a special-purpose computer, such as the circuitry 202. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the circuitry 202 to perform a certain operation or a group of operations associated with the electronic apparatus 104.

The I/O interface 206 may include suitable logic, circuitry, and interfaces that may be configured to receive a user input and provide an output based on the received input. The I/O interface 206 which includes various input and output devices, may be configured to communicate with the circuitry 202. Examples of the I/O interface 206 may include, but are not limited to, a touch screen, a keyboard, a mouse, a joystick, a microphone, a display, and a speaker.

The network interface 208 may include suitable logic, circuitry, interfaces, and/or code that may facilitate a communication between the electronic apparatus 104 of the vehicle 102 and each of the group of electronic devices, such as the first electronic device 106A, the second electronic device 106B, the third electronic device 106C, the fourth electronic device 106D, the fifth electronic device 106E and the sixth electronic device 106F. The network interface 208 may implement known technologies to support wired and/or wireless communication via a wireless communication network. The network interface 208 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 208 may communicate via wired and/or wireless communication with networks, such as the Internet, an Intranet and/or a wireless network, such as a cellular telephone network, a wireless local area network (LAN) and/or a metropolitan area network (MAN). The communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.120g., IEEE 802.11a, IEEE 802.11b, IEEE 802.11g and/or IEEE 802.11n, 802.11p), voice over Internet Protocol (VoIP), Wi-MAX, a protocol for email, instant messaging, and/or Short Message Service (SMS).

The processor 210 may include suitable logic, circuitry, and interfaces that may be configured to execute a set of instructions stored in the memory 204. The processor 210 of the circuitry 202 may be configured to execute program instructions associated with different operations to be executed by the electronic apparatus 104. For example, some of the operations may include determination of the initial MCS level associated with the V2X communication channel, the estimation of the first level of channel congestion in the V2X communication channel, and the selection of the first MCS level based on the estimation of the first level of the channel congestion. The processor 210 may be implemented based on a number of processor technologies known in the art. Examples of the processor technologies may include, but are not limited to, a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), and other processors.

The communication unit 212 may include suitable logic, circuitry, and/or interfaces that may be configured to establish a peer-to-peer V2X communication of the vehicle 102 with one or more of the group of electronic devices. In some embodiments, the communication unit 212 may control tracking diagnostics, and communication of the electronic apparatus 104 of the vehicle 102 with the group of electronic devices. The communication unit 212 may include a global positioning system (GPS) unit that may provide a location of the vehicle 102. The communication unit 212 may further include one or more interfaces for communication, for example, Global System for Mobile Communications (GSM) interface, General Packet Radio Service (GPRS) interface, Long-Term Evolution (LTE) interface, and so forth. The communication unit 212 may further include one or more processing units, for example, a microcontroller, a microprocessor, a field programmable gate array (FPGA), and the like.

The functions or operations executed by the electronic apparatus 104, as described in FIG. 1, may be performed by the circuitry 202. Operations executed by the circuitry 202 are described in detail, for example, in FIG. 4 and FIG. 6.

Figure 3:
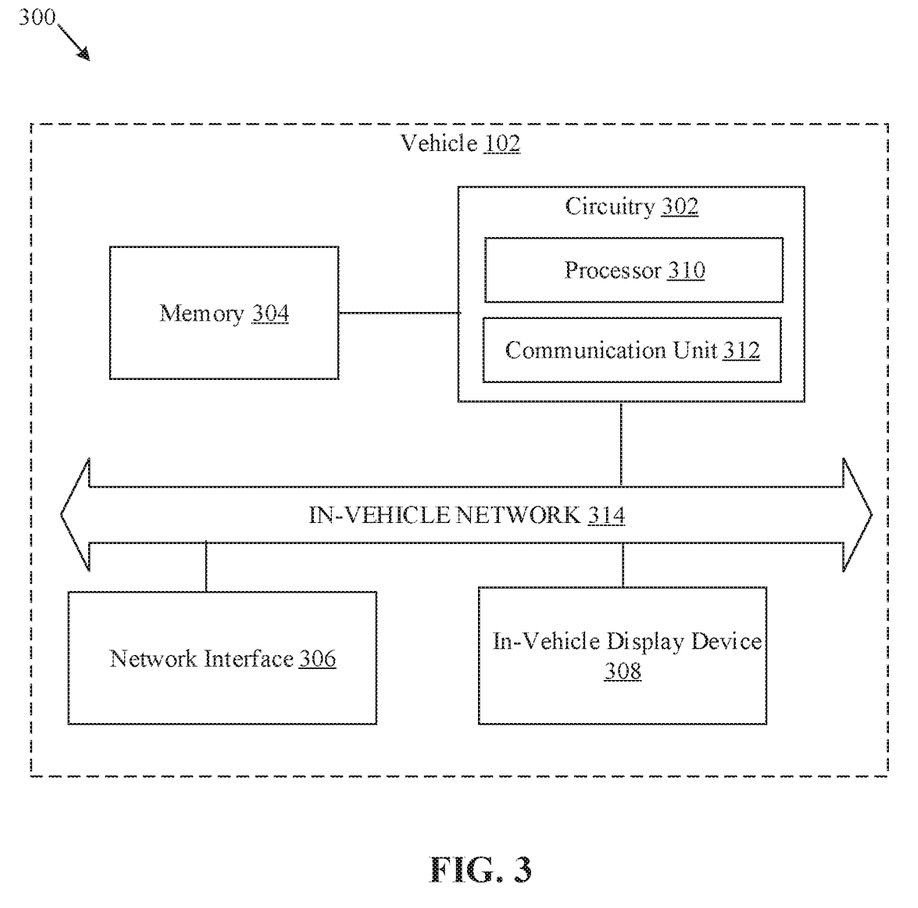
FIG. 3 is a block diagram of an exemplary vehicle for control of congestion in a V2X communication channel, in accordance with an embodiment of the disclosure.

FIG. 3 is a block diagram of an exemplary vehicle for control of congestion in a V2X communication channel, in accordance with an embodiment of the disclosure. FIG. 3 is explained in conjunction with elements from FIG. 1. With reference to FIG. 3, there is shown a block diagram 300 of the vehicle 102. The block diagram 300 of the vehicle 102 may include circuitry 302. The circuitry 302 may be implemented as part of an electronic control unit (ECU) which may include at least a microprocessor and/or a memory. The vehicle 102 may further include a memory 304, a network interface 306 and an in-vehicle display device 308.

The circuitry 302 may further include a processor 310 and a communication unit 312. In an exemplary embodiment, the processor 310 of the circuitry 302 may be same as the processor 210 of the circuitry 202 of FIG. 2. Moreover, the communication unit 312 of the circuitry 302 may be same as the communication unit 212 of the circuitry 202 of FIG. 2. Therefore, the operations performed by the circuitry 202 as explained in FIG. 2 may also be performed by the circuitry 302 of the vehicle 102.

The vehicle 102 may further include an in-vehicle network 314 to facilitate communication between internal components of the vehicle 102. A person of ordinary skilled in the art will understand that the vehicle 102 may also include other suitable components or systems, in addition to the components or systems illustrated herein to describe and explain the function and operation of the present disclosure. A description of such components or systems is omitted herein for the sake of brevity.

The circuitry 302 may include suitable logic, circuitry, and/or interfaces that may be configured to execute program instructions associated with different operations to be executed by the vehicle 102. The circuitry 302 may include any suitable special-purpose or general-purpose computer, computing entity, or processing device including various computer hardware or software modules and may be configured to execute instructions stored on any applicable computer-readable storage media. For example, the circuitry 302 may include a microprocessor, a microcontroller, a DSP, an ASIC, a FPGA, or any other digital or analog circuitry configured to interpret and/or to execute program instructions and/or to process data.

The memory 304 may include suitable logic, circuitry, interfaces, and/or code that may be configured to store the program instructions executable by the circuitry 302. In certain embodiments, the memory 304 may be configured to store operating systems and associated application-specific information. The functions of the memory 304 may be same as the functions of the memory 204 described, for example, in FIG. 2. Therefore, further description of the memory 304 is omitted from the disclosure for the sake of brevity.

The network interface 306 may include suitable logic, circuitry, interfaces, and/or code that may enable communication between the vehicle 102 and each of the group of electronic devices, via a wireless communication network. The network interface 306 may implement known technologies to support wired and/or wireless communication. The network interface 306 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer. The functions of the network interface 306 may be same as the functions of the network interface 208 described, for example, in FIG. 2. Therefore, further description of the network interface 306 is omitted from the disclosure for the sake of brevity.

The in-vehicle display device 308 may include suitable logic, circuitry, interfaces, and/or code that may be configured to render various types of information and/or viewable content via a user interface (UI) of the vehicle 102. The UI may be a customizable or a non-customizable Graphical UI that may display various types of information related to the vehicle 102. Examples of the in-vehicle display device 308 may include, but are not limited to, a display of the infotainment head unit, a projection-based display, a see-through display, and/or an electro-chromic display. In an embodiment, the in-vehicle display device 308 may be implemented as one of, but not limited to, Multi-Information Display (MID), an automotive Head-Up Display (HUD), or an instrument cluster.

The processor 310 may include suitable logic, circuitry, and interfaces that may be configured to execute a set of instructions stored in the memory 304. The processor 310 may be configured to execute program instructions associated with different operations to be executed by the vehicle 102. The functions of the processor 310 may be same as the functions of the processor 210 described, for example, in FIG. 2. Therefore, further description of the processor 310 is omitted from the disclosure for the sake of brevity.

The communication unit 312 may include suitable logic, circuitry, and/or interfaces that may be configured to control tracking, diagnostics, and communication of the vehicle 102 with the group of electronic devices. The communication unit 312 may include a GPS unit, one or more interfaces for communication, for example, a GSM interface, a GPRS interface, an LTE interface, and so forth. The functions of the communication unit 312 may be same as the functions of the communication unit 212 described, for example, in FIG. 2. Therefore, further description of the communication unit 312 is omitted from the disclosure for the sake of brevity.

It should be noted that some or all of the functions and/or operations performed by the circuitry 202 (as described in FIG. 2) may be performed by the circuitry 302, without a deviation from the scope of the disclosure.

Figure 4:
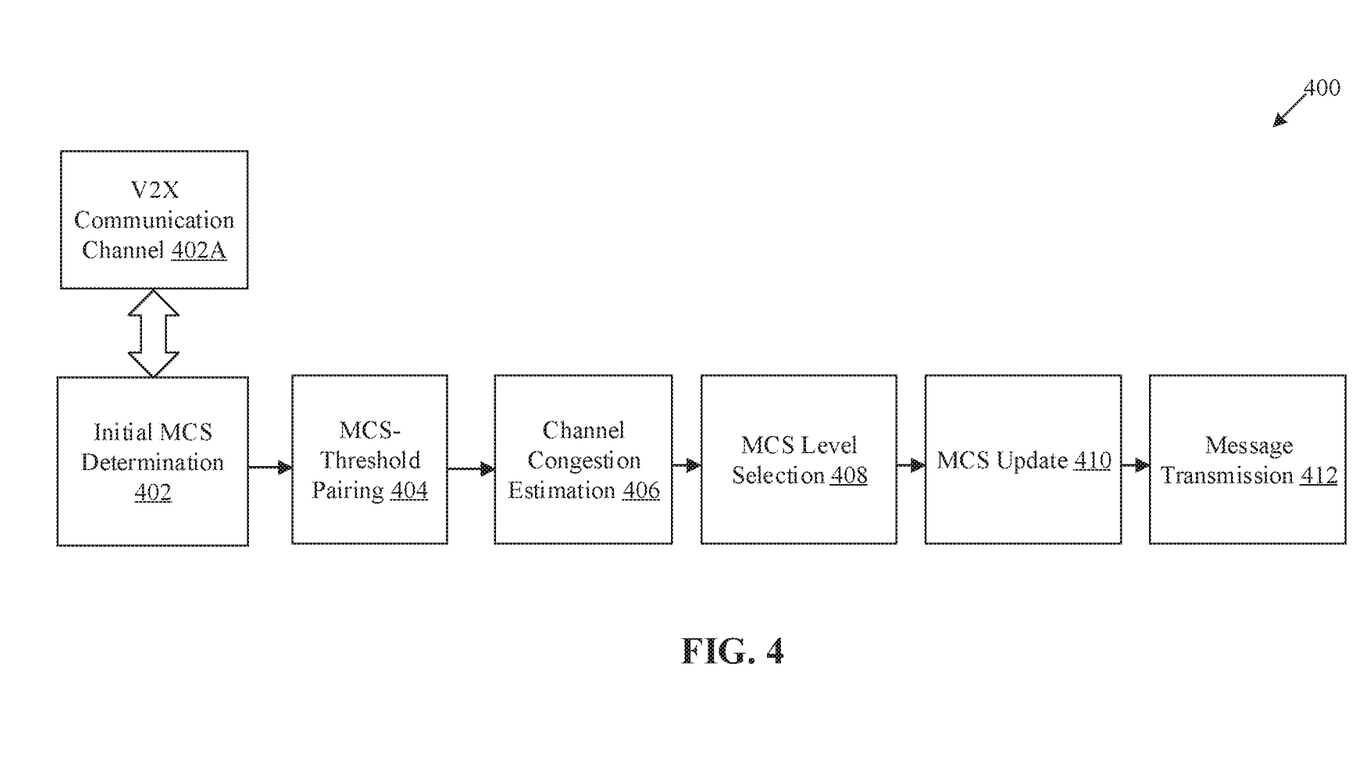
FIG. 4 is a diagram that illustrates exemplary operations for control of congestion in a V2X communication channel, in accordance with an embodiment of the disclosure.

FIG. 4 is a diagram that illustrates exemplary operations for control of congestion in a V2X communication channel, in accordance with an embodiment of the disclosure. FIG. 2 is explained in conjunction with elements from FIG. 1, FIG. 2, and FIG. 3. With reference to FIG. 4, there is shown a diagram 400 to depict exemplary operations from 402 to 412. The exemplary operations illustrated in the diagram 400 may start at 402 and may be performed by any computing system, apparatus, or device, such as by the electronic apparatus 104 of FIG. 2 or the vehicle 102 of FIG. 3.

At 402, an initial MCS level associated a V2X communication channel 402A of the vehicle 102 may be estimated. In one or more embodiments, the circuitry 202 (or the circuitry 302) may estimate the initial MCS level as one of a plurality of MCS levels for V2X communication. An example of the plurality of MCS levels for LTE-V2X (or C-V2X) is provided in MCS Table 1, as follows:

| MCS Table 1 for LTE-V2X | | | |
| --- | --- | --- | --- |
| MCS Level | Modulation, Coding Rate | Min. SINR (dB) | Range (m) |
| 0 | QPSK, 0.13 | −2.83 | 418 |
| 1 | QPSK, 0.17 | −1.83 | 411 |
| 2 | QPSK, 0.21 | −0.22 | 404 |
| 3 | QPSK, 0.27 | 1.49 | 392 |
| 4 | QPSK, 0.33 | 2.76 | 382 |
| 5 | QPSK, 0.41 | 4.40 | 365 |
| 6 | QPSK, 0.48 | 5.79 | 354 |
| 7 | QPSK, 0.57 | 7.30 | 336 |
| 8 | QPSK, 0.65 | 8.60 | 320 |
| 9 | QPSK, 0.73 | 9.88 | 306 |
| 10 | QPSK, 0.82 | 11.16 | 294 |
| 11 | 16QAM, 0.41 | 11.16 | 294 |
| 12 | 16QAM, 0.46 | 12.83 | 278 |
| 13 | 16QAM, 0.52 | 14.46 | 258 |
| 14 | 16QAM, 0.59 | 16.39 | 237 |
| 15 | 16QAM, 0.67 | 18.73 | 213 |
| 16 | 16QAM, 0.72 | 20.05 | 203 |
| 17 | 16QAM, 0.75 | 21.10 | 191 |
| 18 | 16QAM, 0.84 | 23.54 | 172 |
| 19 | 16QAM, 0.92 | 25.93 | 150 |
| 20 | 16QAM, 1.00 | 28.10 | 137 |

In MCS Table 1, there are 21 MCS levels from 0 to 20, with MCS 0 to MCS 10 associated with QPSK and MCS 11 to MCS 20 associated with 16QAM. While the coding rate (i.e. a proportion of data stream that is useful data) increases as we move from MCS 0 to MCS 20, the range of communication decreases from 418 meters (m) to 137 m. Herein, the MCS Table 1 is merely provided as an example and should not be construed as limiting for the scope of the disclosure. The present disclosure may be applicable to MCS tables with different MCS levels, modulation modes, coding rates, or ranges of communication, without a deviation from the scope of disclosure.

At 404, each MCS level of the plurality of MCS levels may be paired with a corresponding threshold level of a plurality of threshold levels of the channel congestion. In one or more embodiments, the circuitry 202 may pair each MCS level with a corresponding threshold level of the plurality of threshold levels. An example of the pairing of some of the MCS levels of the MCS Table 1 with different threshold levels is provided in Table 2, as follows:

TABLE 2

Pairing of plurality of MCS levels

| Threshold levels (%) | MCS levels |
|---|---|
| 60 | MCS 8 |
| 80 | MCS 9 |
| 100 | MCS 10 |

In Table 2, a 60% threshold level may be paired with an MCS level 8, an 80% threshold level may be paired with an MCS level 9 and a 100% threshold level may be paired with an MCS level 10. The pairing of the MCS levels and the threshold levels in Table 2 is merely provided as an example and should not be construed as limiting for the scope of the present disclosure. The present disclosure may be also applicable to a pairing of more or lesser number of MCS levels and threshold levels.

At 406, a first level of channel congestion associated with the V2X communication channel 402A may be estimated. In one or more embodiments, the circuitry 202 (or the circuitry 302) may estimate the first level of channel congestion at the determined initial MCS level. By way of example, and not limitation, the circuitry 202 may measure a channel busy percentage (CBP) or a channel busy ratio (CBR) associated with the V2X communication channel 402A. Based on the measurement of CBP or CBR, the first level of channel congestion associated with the V2X communication channel 402A may be estimated. The CBP may be indicative of a percentage (from 0% to 100%) of time for which the V2X communication channel 402A remains busy or occupied by an ongoing transmission (for example, transmission of message information) to the group of electronic devices 106A . . . 106F. At the CBP of 0%, the V2X communication channel 402A may be least occupied and at the CBP of 100%, the V2X communication channel 402A may be most occupied. Similar to CBP, the CBR may be indicative of a ratio of a channel time for which the V2X communication channel 402A is busy to a total observation time. The value of the CBP or the CBR may depend on a number of vehicles or devices in a communication range of the vehicle 102 and an individual transmit rate of the message information of each of such vehicles or the devices.

At 408, a first MCS level may be selected from the plurality of MCS levels based on a determination that the estimated first level (at 406) of the channel congestion is greater than or equal to a first threshold level of the plurality of threshold levels. The selected first MCS level may be associated (paired at 404) with the first threshold level and may be greater than the initial MCS level (determined at 402). For example, if the estimated first level of the channel congestion equals or exceeds the 60% threshold level of Table 2, the first MCS level may be selected as MCS 8, which may be paired with the 60% threshold level.

At 410, the initial MCS level (determined at 402) may be updated to the first MCS level (selected at 408). In accordance with an embodiment, the circuitry 202 (or the circuitry 302) may update the initial MCS level (such as from an initial MCS level of MCS 7) to the first MCS level (such as MCS 8 of Table 2). The update may configure the V2X communication channel 402A to transmit the message information at the first MCS level instead of the initial MCS level.

As the initial MCS level is updated to a higher MCS level (i.e. the first MCS level), the duration of data packets over the V2X communication channel 402A may decrease causing the level of the channel congestion to decrease. The decrease in the duration of data packets may be due to a higher transmit rate supported by the selected first MCS level as compared to a lower transmit rate supported by the initial MCS level.

At the higher MCS level, the communication range of the vehicle 102 over the V2X communication channel 402A decreases as a result of the selected first MCS level. The decrease in the communication range may restrict the V2X communication only to electronic devices which may lie in a decreased communication range. For example, the MCS Table 1 shows the decrease in the range of communication with increase in the MCS levels. However, if it is assumed that the channel congestion typically occurs in busy environments with many various communicating devices around the vehicle 102, then the speed of the vehicle 102 may be low enough to a point that there may not be a significant need for a higher transmit range.

At 412, the message information may be transmitted from the vehicle 102 to the group of electronic devices 106A . . . 106F at the selected first MCS level. In accordance with an embodiment, the circuitry 202 (or the circuitry 302) may transmit, at the selected first MCS level, the message information over the V2X communication channel 402A to the group of electronic devices 106A . . . 106F.

Although the diagram 400 is illustrated as discrete operations, such as 402, 404, 406, 408, 410, and 412, however, in certain embodiments, such discrete operations may be further divided into additional operations, combined into fewer operations, or eliminated, depending on the particular implementation without detracting from the essence of the disclosed embodiments.

Figure 5:
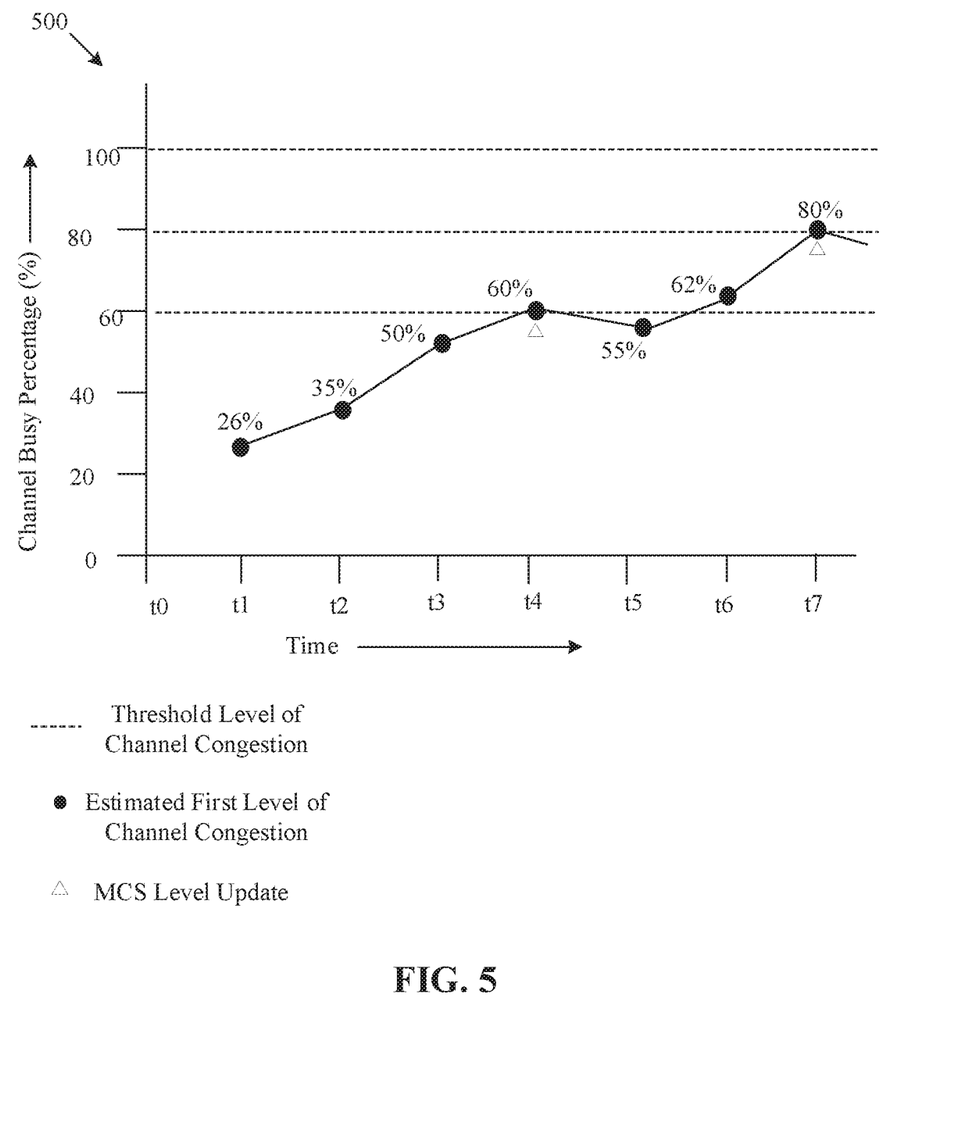
FIG. 5 illustrates an example graph which depicts MCS level control for decongestion of a V2X communication channel, in accordance with an embodiment of the disclosure.

FIG. 5 illustrates an example graph which depicts MCS level control for decongestion of a V2X communication channel, in accordance with an embodiment of the disclosure. With reference to FIG. 5, there is shown a graph 500. The graph 500 may depicts a variation in the estimated first level of channel congestion for a number of discrete time instants, such as t0, t1, t2, t3, t4, t5, t6, and t7. Specifically, the graph 500 is a CBP versus (vs) time graph, where the CBP measurements (between 0% and 100%) of the V2X communication channel 402A are plotted against the number of discrete time instants.

In the graph 500, the threshold levels for the CBP measurements are depicted by dotted lines as 60% CBP, 80% CBP, and 100% CBP. The estimated first level of the channel congestion increases from 26% at t1 to 35% at t2 and 50% at t3. As the channel congestion crosses the threshold level of 60% at t4, the initial MCS level (e.g., MCS 7 of Table 2) may be updated to a higher MCS level (MCS 8) associated with the threshold level of 60%. Such an update may cause a reduction in the channel congestion to 55% at t5.

In case the estimated first level of the channel congestion increases back to 62% at t6, there may be no MCS selection at 60% threshold level as MCS 8 is already selected. When the estimated first level of the channel congestion crosses the 80% threshold level to 82% at t7, the V2X communication channel 402A may switch from MCS 8 to MCS 9 (i.e. a higher MCS level) associated with the 80% threshold level.

Figure 6:
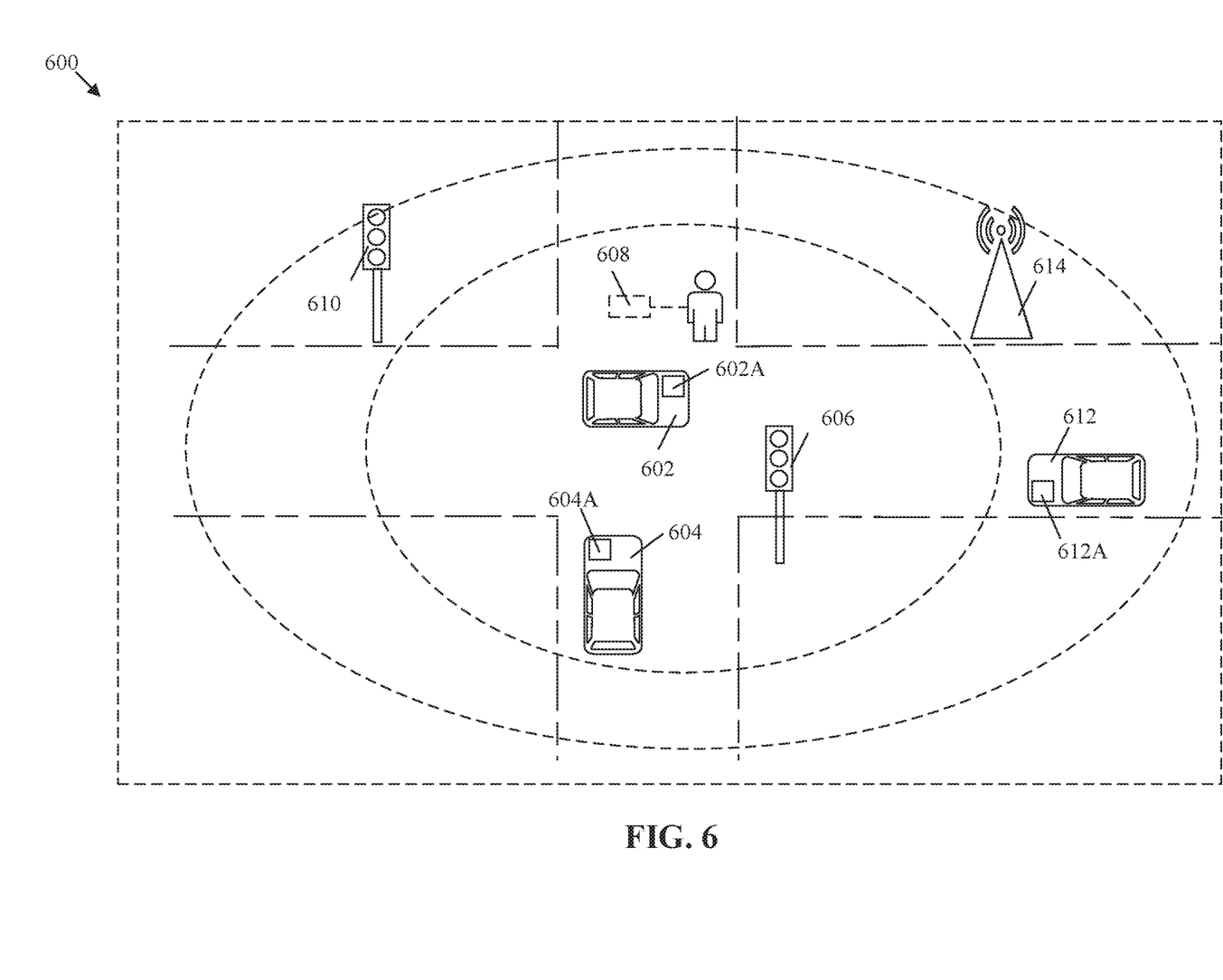
FIG. 6 is a diagram that illustrates an exemplary scenario for control of congestion in a V2X communication channel, in accordance with an embodiment of the disclosure.

FIG. 6 is a diagram that illustrates an exemplary scenario for control of congestion in a V2X communication channel, in accordance with an embodiment of the disclosure. FIG. 6 is explained in conjunction with elements from FIG. 1, FIG. 2, FIG. 3, FIG. 4, and FIG. 5. With reference to FIG. 6, there is shown an exemplary scenario 600. The exemplary scenario 600 may include a first vehicle 602, which may be exemplary implementation of the vehicle 102 of FIG. 1 or FIG. 3. The first vehicle 602 may include the electronic apparatus 602A, which may be an exemplary implementation of the electronic apparatus 104 of FIG. 1 of FIG. 2. The first vehicle 602 may be configured to communicate with a group of electronic devices, such as a communication unit 604A of a second vehicle 604, a first traffic light system 606, a smartphone 608 associated with a pedestrian, a second traffic light system 610, a communication unit 612A of a third vehicle 612, and a roadside unit 614.

In the exemplary scenario 600, an exemplary method of MCS-based control of the channel congestion is described. In the exemplary method, the electronic apparatus 602A of the first vehicle 602 may broadcast message information at two separate MCS levels, one at a higher MCS level with a higher transmit rate, and the other at a lower MCS level with a lower transmit rate than that of the higher MCS level. For instance, the electronic apparatus 602A may select a first MCS level and a second MCS level from the plurality of MCS levels. The selected second MCS level may be less than the initial MCS level while the selected first MCS level is greater than the initial MCS level. For example, if the initial MCS level is MCS 7, then the first MCS level may be selected as MCS 8 and the second MCS level may be MCS 6. Similar to the first MCS level, the second MCS level may be selected based on a determination that the estimated first level (for example, 62% channel congestion) of the channel congestion is greater than or equal to the first threshold level (for example, a 60% threshold level).

The electronic apparatus 602A may transmit the message information over the V2X communication channel at each of the selected first MCS level and the selected second MCS level to the group of electronic devices. As shown, for example, the electronic apparatus 602A may transmit the message information at the selected first MCS level to the communication unit 604A of the second vehicle 604, the first traffic light system 606, and the smartphone 608 associated with the pedestrian. Similarly, the electronic apparatus 602A may transmit the message information at the selected second MCS level to the second traffic light system 610, the communication unit 612A of the third vehicle 612, and the roadside unit 614.

This method may enable electronic devices that are closer to a transmitting vehicle (i.e. the first vehicle 602) to track the message information with a higher accuracy. Other electronic devices which are further away may track the message information at a lower frequency. Nevertheless, with two separate MCS levels, the channel congestion may be reduced as the higher transmit rate may use a more efficient MCS level.

An exemplary scenario is described herein for MCS adjustment during an emergency condition associated with the first vehicle 602. The electronic apparatus 602A may determine an emergency condition associated with the first vehicle 602. Examples of the emergency condition may include, but are not limited to, accident of the first vehicle 602 due to collision with other vehicles or nearby infrastructure, such as a traffic system, occurrence of a technical fault in the vehicle 102, or deployment of air bags due to loss of control of the vehicle 102. Based on the determined emergency condition, the electronic apparatus 602A may select a third MCS level from the plurality of MCS levels. The third MCS level may be less than the initial MCS level at which the first level of channel congestion is estimated. Thereafter, the electronic apparatus 602A may broadcast the message information, including one or more emergency messages associated with the determined emergency condition, at the selected third MCS level over the V2X communication channel.

By way of example, and not limitation, if the initial MCS level is MCS 6, then the third MCS level may be selected as MCS 5 or MCS 4. With decrease in the MCS level from MCS 6 to MCS 5/MCS 4, the transmit rate of the message information may decrease and the range of communication of the vehicle 102 may increase. This may be helpful in critical cases where the first vehicle 602 needs to broadcast the message information at higher distances with lower attenuation.

Figure 7:
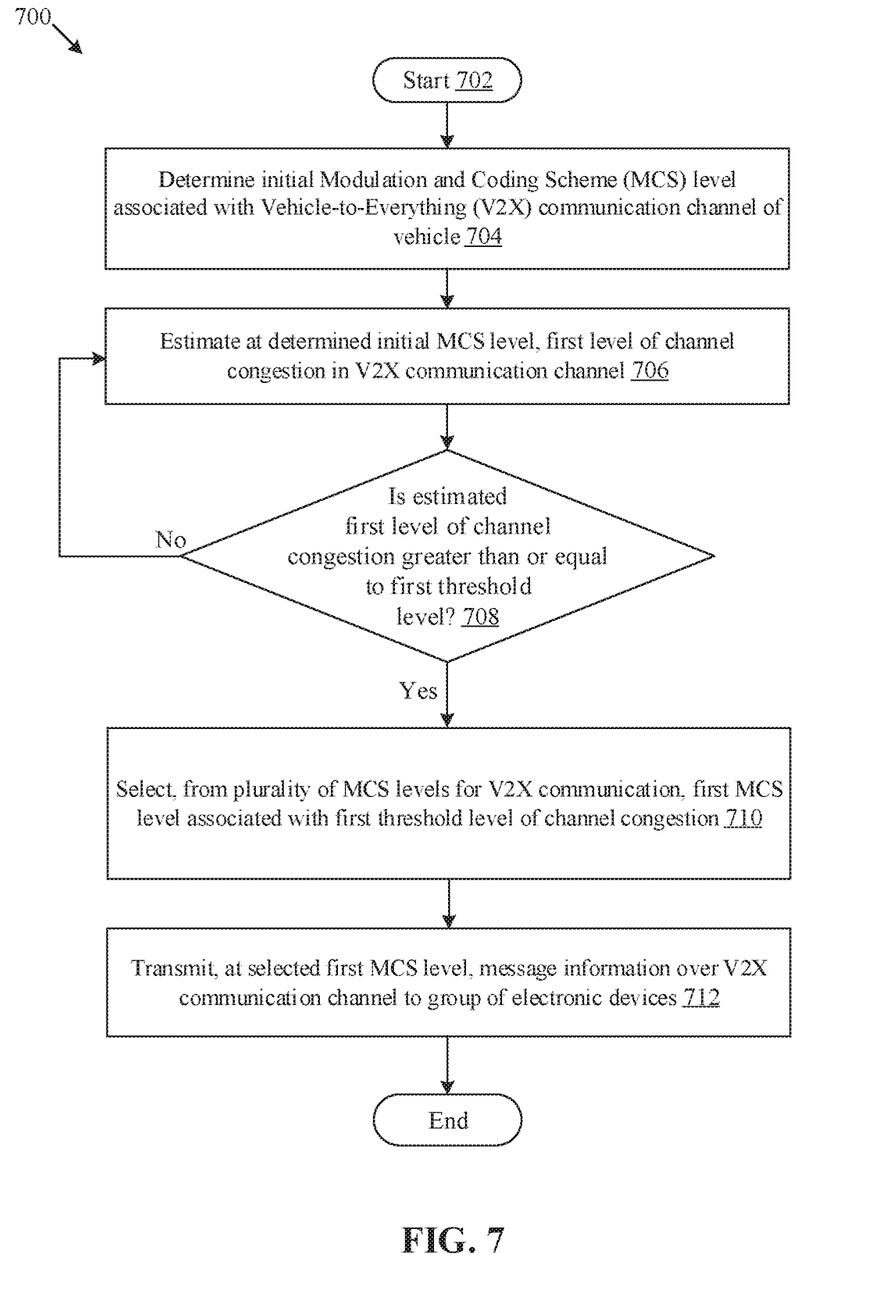
FIG. 7 illustrates a flowchart of an exemplary method for channel congestion control in V2X communication, in accordance with an embodiment of the disclosure.

FIG. 7 illustrates a flowchart of an exemplary method for channel congestion control in V2X communication, in accordance with an embodiment of the disclosure. FIG. 7 is explained in conjunction with elements from FIGS. 1, 2, 3, 4, 5, and 6. With reference to FIG. 7, there is shown a flowchart 700. The method illustrated in the flowchart 700 may start at 702 and proceed to 704. The method illustrated in the flowchart 700 may be performed by any computing system, apparatus, or device, such as by the circuitry 202 of the electronic apparatus 104 or the circuitry 302 of the vehicle 102.

At 704, an initial MCS level associated with the V2X communication channel of the vehicle 102 may be determined. In at least one embodiment, the circuitry 202 (or the circuitry 302) may be configured to determine the initial MCS level associated with the V2X communication channel of the vehicle 102.

At 706, the first level of channel congestion at the initial MCS level may be estimated in the V2X communication channel. In at least one embodiment, the circuitry 202 (or the circuitry 302) may be configured to estimate, at the determined initial MCS level, the first level of channel congestion in the V2X communication channel. For example, the first level of channel congestion may be estimated by measurement of a channel busy percentage (CBP) or a channel busy ratio (CBR) associated with the V2X communication channel.

At 708, it may be determined whether the estimated first level of the channel congestion is greater than or equal to a first threshold level of the plurality of threshold levels of the channel congestion. In cases where the estimated first level of the channel congestion is greater than or equal to the first threshold level, control may pass to 710. Otherwise, control may pass to 706 and the first level of the channel congestion may be re-estimated and rechecked at 708.

At 710, a first MCS level associated with the first threshold level may be selected from the plurality of MCS levels for the V2X communication. In at least one embodiment, the circuitry 202 (or the circuitry 302) may be configured to select the first MCS level from the plurality of MCS levels. The selected first MCS level may be greater than the initial MCS level associated with the V2X communication channel.

At 712, the message information may be transmitted at the selected first MCS level over the V2X communication channel to the group of electronic devices 106A . . . 106F. In at least one embodiment, the circuitry 202 (or the circuitry 302) may be configured to transmit the message information over the V2X communication channel to the group of electronic devices 106A . . . 106F at the selected first MCS level. Control may pass to end.

The flowchart 700 is illustrated as discrete operations, such as 704, 706, 708, 710, and 712. However, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer readable medium and/or storage medium having stored thereon, instructions executable by a machine and/or a computer to operate an electronic apparatus or a vehicle, such as the electronic apparatus 104 or the vehicle 102. The instructions may cause the machine and/or computer to perform operations that include determining an initial Modulation and Coding Scheme (MCS) level associated with the V2X communication channel of a vehicle and estimating, at the determined initial MCS level, a first level of channel congestion in the V2X communication channel. The operations may further include selecting, from a plurality of MCS levels for V2X communication, a first MCS level associated with a first threshold level of a plurality of threshold levels of the channel congestion. The selection of the first MCS level may be based on determination that the estimated first level of the channel congestion is greater or equal to the first threshold level, and the selected first MCS level is greater than the initial MCS level. The operations may further include transmitting, at the selected first MCS level, message information over the V2X communication channel to a group of electronic devices.

For the purposes of the present disclosure, expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural. Further, all joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein but can be employed in any number of applications and equivalent devices by those of ordinary skill in the art. Rather it is hereby intended the scope be defined by the claims appended hereto. Additionally, the features of various implementing embodiments may be combined to form further embodiments.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure is not limited to the particular embodiment disclosed, but that the present disclosure will include all embodiments that fall within the scope of the appended claims.

What is claimed is:

1. An electronic apparatus for a vehicle, comprising:
   circuitry configured to:
   determine an initial Modulation and Coding Scheme (MCS) level associated with a Vehicle-to-Everything (V2X) communication channel of the vehicle;
   estimate, at the determined initial MCS level, a first level of channel congestion in the V2X communication channel;
   select, from a plurality of MCS levels for V2X communication, a first MCS level associated with a first threshold level of a plurality of threshold levels of the channel congestion, wherein
   the selection of the first MCS level is based on a determination that the estimated first level of the channel congestion is greater than or equal to the first threshold level, and
   the selected first MCS level is greater than the initial MCS level;
   transmit, at the selected first MCS level, message information over the V2X communication channel to a group of electronic devices;
   determine an emergency condition associated with the vehicle, wherein the determined emergency condition includes one of a collision of the vehicle or an occurrence of a technical fault in the vehicle;
   select, from the plurality of MCS levels, a second MCS level for the V2X communication based on the determined emergency condition, wherein
   the second MCS level is less than the initial MCS level at which the first level of the channel congestion is estimated; and broadcast, at the selected second MCS level, the message information comprising one or more emergency messages over the V2X communication channel to the group of electronic devices, wherein the message information is associated with the determined emergency condition.

2. The electronic apparatus according to claim 1, wherein the circuitry is further configured to:
measure a channel busy percentage (CBP) or a channel busy ratio (CBR) associated with the V2X communication channel; and
estimate the first level of the channel congestion in the V2X communication channel based on the measurement.

3. The electronic apparatus according to claim 1, wherein the circuitry is further configured to pair each MCS level of the plurality of MCS levels with a corresponding threshold level of the plurality of threshold levels of the channel congestion.

4. The electronic apparatus according to claim 1, wherein the circuitry is further configured to:
select, from the plurality of MCS levels, a third MCS level which is less than the initial MCS level,
wherein the third MCS level is selected based on the determination that the estimated first level of the channel congestion is greater than or equal to the first threshold level; and
transmit the message information over the V2X communication channel at each of the selected first MCS level and the selected third MCS level to the group of electronic devices.

5. The electronic apparatus according to claim 4, wherein the selected first MCS level is associated with a first transmit rate which is greater than a second transmit rate associated with the selected third MCS level.

6. The electronic apparatus according to claim 1, wherein the circuitry is further configured to:
update the initial MCS level to the selected first MCS level; and
transmit, at the selected first MCS level, the message information over the V2X communication channel based on the update.

7. The electronic apparatus according to claim 1, wherein the plurality of MCS levels is associated with one of a Cellular-V2X communication protocol or a Dedicated Short-Range Communication (DSRC) protocol.

8. The electronic apparatus according to claim 1, wherein the V2X communication corresponds to one or more of vehicle-to-infrastructure (V2I) communication, vehicle-to-network (V2N) communication, vehicle-to-vehicle (V2V) communication, vehicle-to-pedestrian (V2P) communication, vehicle-to-device (V2D) communication, or vehicle-to-grid (V2G) communication.

9. A vehicle, comprising:
circuitry configured to:
determine an initial Modulation and Coding Scheme (MCS) level associated with a Vehicle-to-Everything (V2X) communication channel of the vehicle;
estimate, at the determined initial MCS level, a first level of channel congestion in the V2X communication channel;
select, from a plurality of MCS levels for V2X communication, a first MCS level associated with a first threshold level of a plurality of threshold levels of the channel congestion, wherein
the selection of the first MCS level is based on a determination that the estimated first level of the channel congestion is greater than or equal to the first threshold level, and
the selected first MCS level is greater than the initial MCS level;
transmit, at the selected first MCS level, message information over the V2X communication channel to a group of electronic devices;
determine an emergency condition associated with the vehicle, wherein the determined emergency condition includes one of a collision of the vehicle or an occurrence of a technical fault in the vehicle;
select, from the plurality of MCS levels, a second MCS level for the V2X communication based on the determined emergency condition, wherein
the second MCS level is less than the initial MCS level at which the first level of the channel congestion is estimated; and
broadcast, at the selected second MCS level, the message information comprising one or more emergency messages over the V2X communication channel to the group of electronic devices, wherein the message information is associated with the determined emergency condition.

10. The vehicle according to claim 9, wherein the circuitry is further configured to:
measure a channel busy percentage (CBP) or a channel busy ratio associated with the V2X communication channel; and
estimate the first level of the channel congestion in the V2X communication channel based on the measurement.

11. The vehicle according to claim 9, wherein the circuitry is further configured to pair each MCS level of the plurality of MCS levels with a corresponding threshold level of the plurality of threshold levels of the channel congestion.

12. The vehicle according to claim 9, wherein the circuitry is further configured to:
select, from the plurality of MCS levels, a third MCS level which is less than the initial MCS level,
wherein the third MCS level is selected based on the determination that the estimated first level of the channel congestion is greater than or equal to the first threshold level; and
transmit the message information over the V2X communication channel at each of the selected first MCS level and the selected third MCS level to the group of electronic devices.

13. The vehicle according to claim 12, wherein the selected first MCS level is associated with a first transmit rate which is greater than a second transmit rate associated with the selected third MCS level.

14. The vehicle according to claim 9, wherein the circuitry is further configured to:
update the initial MCS level to the selected first MCS level; and
transmit, at the selected first MCS level, the message information over the V2X communication channel based on the update.

15. The vehicle according to claim 9, wherein the plurality of MCS levels is associated with one of a Cellular-V2X communication protocol or a Dedicated Short-Range Communication (DSRC) protocol.

16. The vehicle according to claim 9, wherein the V2X communication corresponds to one or more of vehicle-to-infrastructure (V2I) communication, vehicle-to-network (V2N) communication, vehicle-to-vehicle (V2V) communication, vehicle-to-pedestrian (V2P) communication, vehicle-to-device (V2D) communication, and vehicle-to-grid (V2G) communication.

17. A method, comprising:
   determining an initial Modulation and Coding Scheme (MCS) level associated with a Vehicle-to-Everything (V2X) communication channel of a vehicle;
   estimating, at the determined initial MCS level, a first level of channel congestion in the V2X communication channel;
   selecting, from a plurality of MCS levels for V2X communication, a first MCS level associated with a first threshold level of a plurality of threshold levels of the channel congestion, wherein
      the selection of the first MCS level is based on a determination that the estimated first level of the channel congestion is greater than or equal to the first threshold level, and
      the selected first MCS level is greater than the initial MCS level;
   transmitting, at the selected first MCS level, message information over the V2X communication channel to a group of electronic devices;
   determining an emergency condition associated with the vehicle, wherein the determined emergency condition includes one of a collision of the vehicle or an occurrence of a technical fault in the vehicle;
   selecting, from the plurality of MCS levels, a second MCS level for the V2X communication based on the determined emergency condition, wherein
      the second MCS level is less than the initial MCS level at which the first level of the channel congestion is estimated; and
   broadcasting, at the selected second MCS level, the message information comprising one or more emergency messages over the V2X communication channel to the group of electronic devices, wherein the message information is associated with the determined emergency condition.

18. The method according to claim 17, further comprising:
   selecting, from the plurality of MCS levels, a third MCS level which is less than the initial MCS level,
      wherein the third MCS level is selected based on the determination that the estimated first level of the channel congestion is greater than or equal to the first threshold level; and
   transmitting the message information over the V2X communication channel at each of the selected first MCS level and the selected third MCS level to the croup of electronic devices.

19. The electronic apparatus according to claim 4, wherein
   the group of electronic devices includes a group of first electronic devices and a group of second electronic devices different from the group of first electronic devices,
   the group of first electronic devices is at a first distance from the vehicle,
   the group of second electronic devices is at a second distance from the vehicle,
   the second distance is greater than the first distance, and
   the circuitry is configured to:
      transmit the message information over the V2X communication channel at the selected first MCS level to the group of first electronic devices; and
      transmit the message information over the V2X communication channel at the selected second MCS level to the group of second electronic devices.

20. The electronic apparatus according to claim 1, wherein
   each of the plurality of MCS levels is associated with one of a plurality of modulation modes, and
   the plurality of modulation modes includes a binary phase shift keying (BPSK) modulation mode, a quadrature phase shift keying (QPSK) modulation mode, a 16 quadrature amplitude modulation (16-QAM) mode, and a 64-QAM mode.

* * * * *